United States Patent
Kane et al.

(10) Patent No.: US 7,032,123 B2
(45) Date of Patent: Apr. 18, 2006

(54) ERROR RECOVERY

(75) Inventors: Donald Kane, San Diego, CA (US);
Daniel P. Drogichen, Leucadia, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 584 days.

(21) Appl. No.: 10/043,974

(22) Filed: Oct. 19, 2001

(65) Prior Publication Data
US 2003/0084369 A1    May 1, 2003

(51) Int. Cl.
*G06F 11/20* (2006.01)

(52) U.S. Cl. .................... 714/5; 714/6; 714/42; 711/3; 711/207

(58) Field of Classification Search .............. 714/5, 714/6, 42, 52, 53, 54; 711/3, 118, 128, 207
See application file for complete search history.

(56) References Cited

U.S. PATENT DOCUMENTS

| | | | |
|---|---|---|---|
| 5,379,415 A | | 1/1995 | Papenberg et al. |
| 5,544,341 A | * | 8/1996 | Nakagawa et al. ............ 714/5 |
| 5,867,511 A | * | 2/1999 | Arimilli et al. ............. 714/805 |
| 5,894,487 A | * | 4/1999 | Levitan ....................... 714/819 |
| 5,963,718 A | * | 10/1999 | Muramatsu ................. 714/54 |
| 6,078,995 A | * | 6/2000 | Bewick et al. .............. 711/118 |
| 6,480,975 B1 | * | 11/2002 | Arimilli et al. ............... 714/52 |
| 6,622,267 B1 | * | 9/2003 | Zhang ......................... 714/53 |
| 2002/0124143 A1 | * | 9/2002 | Barroso et al. ................ 714/6 |
| 2003/0028819 A1 | * | 2/2003 | Chiu et al. ..................... 714/5 |

FOREIGN PATENT DOCUMENTS

EP    0 802 485    10/1997

OTHER PUBLICATIONS

International Search Report, Application No. EP 02 25 7074, mailed Dec. 19, 2002.

* cited by examiner

*Primary Examiner*—Robert Beausoleil
*Assistant Examiner*—Joseph D Manoskey
(74) *Attorney, Agent, or Firm*—Meyertons Hood Kivlin Kowert & Goetzel, P.C.; B. Noël Kivlin (57) ABSTRACT

The present invention provides a method and apparatus for error recovery in a system. The apparatus comprises a directory cache adapted to store at least one entry and a control unit. The control unit is adapted to determine if at least one uncorrectable error exists in the directory cache and to place the directory cache offline in response to determining that the error is uncorrectable. The method comprises detecting an error in data stored in a storage device in the system, and determining if the detected error is correctable. The method further comprises making at least a portion of the storage device unavailable to one or more resources in the system in response to determining that the error is uncorrectable.

13 Claims, 7 Drawing Sheets

ERROR RECOVERY

BACKGROUND OF THE INVENTION

1. Field of the Invention

This invention relates generally to processor-based systems, and, more particularly, to error recovery in a directory cache of a distributed, shared-memory processor-based system.

2. Description of the Related Art

Businesses typically rely on network computing to maintain a competitive advantage over other businesses. As such, developers, when designing processor-based systems for use in network-centric environments, may take several factors into consideration to meet the expectation of the customers, factors such as functionality, reliability, scalability, and performance of such systems.

One example of a processor-based system used in a network-centric environment is a mid-range server system. A single mid-range server system may have a plurality of system boards that may, for example, be configured as one or more domains, where a domain, for example, may act as a separate machine by running its own instance of an operating system to perform one or more of the configured tasks.

A mid-range server, in one embodiment, may employ a distributed shared memory system, where processors from one system board can access memory contents from another system board. The union of all of the memories on the system boards of the mid-range server comprises a distributed shared memory (DSM).

One method of accessing data from other system boards within a system is to broadcast a memory request on a common bus. For example, if a requesting system board desires to access information stored in a memory line residing in a memory of another system board, the requesting system board typically broadcasts on the common bus its memory access request. All of the system boards in the system may receive the same request, and the system board whose memory address ranges match the memory address provided in the memory access request may then respond.

The broadcast approach for accessing contents of memories in other system boards may work adequately when a relatively small number of system boards are present in a system. However, such an approach may be unsuitable as the number of system boards grows. As the number of system boards grows, so does the number of memory access requests, thus to handle this increased traffic, larger and faster buses may be needed to allow the memory accesses to complete in a timely manner. Operating a large bus at high speeds may be problematic because of electrical concerns, in part, due to high capacitance, inductance, and the like. Furthermore, a larger number of boards within a system may require extra broadcasts, which could further add undesirable delays and may require additional processing power to handle the extra broadcasts.

Designers have proposed the use of directory caches in a distributed shared memory systems to reduce the need for globally broadcasting memory requests. Typically, each system board serves as home board for memory lines within a selected memory address range, and where each system board is aware of the memory address ranges belonging to the other system boards within the system. Each home board generally maintains its own directory cache for memory lines that fall within its address range. Thus, when a requesting board desires to access memory contents from another board, instead of generally broadcasting the memory request in the system, the request is transmitted to the appropriate home board. The home board may consult its directory cache and determine which system board is capable of responding to the memory request.

Directory caches are generally effective in reducing the need for globally broadcasting memory requests during memory accesses. However, as would be expected, the effectiveness of the directory caches depends in part on the directory caches being properly operational while the system is running. An inoperable or a partially inoperable (i.e., functioning but with one or more errors) directory cache may sometimes go undetected for extended periods of time, and may thereby adversely affect the overall operation of the system.

SUMMARY OF THE INVENTION

In one aspect of the instant invention, an apparatus is provided for error recovery in a system. The apparatus comprises a directory cache adapted to store at least one entry and a control unit. The control unit is adapted to determine if at least one uncorrectable error exists in the directory cache and to place the directory cache offline in response to determining that the error is uncorrectable.

In another aspect of the present invention, a method is provided for error recovery in a system. The method comprises detecting an error in data stored in a storage device in the system, and determining if the detected error is correctable. The method further comprises making at least a portion of the storage device unavailable to one or more resources in the system in response to determining that the error is uncorrectable.

In yet another aspect of the instant invention, an article comprising one or more machine-readable storage media containing instructions is provided for error recovery. The instructions, when executed, may enable a processor to determine a multiple-bit error in data stored in a storage device of a domain and to isolate at least a portion of the storage device from one or more resources in the domain while the domain is active, in response to determining the multiple-bit error.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

As will be described in more detail below, in accordance with one or more embodiments of the present invention, an inoperable or partially inoperable directory cache may be logically isolated, serviced, and then dynamically integrated into a domain in a processor-based system. As a consequence, the overall efficiency of the processor-based system may be improved.

Figure 1:
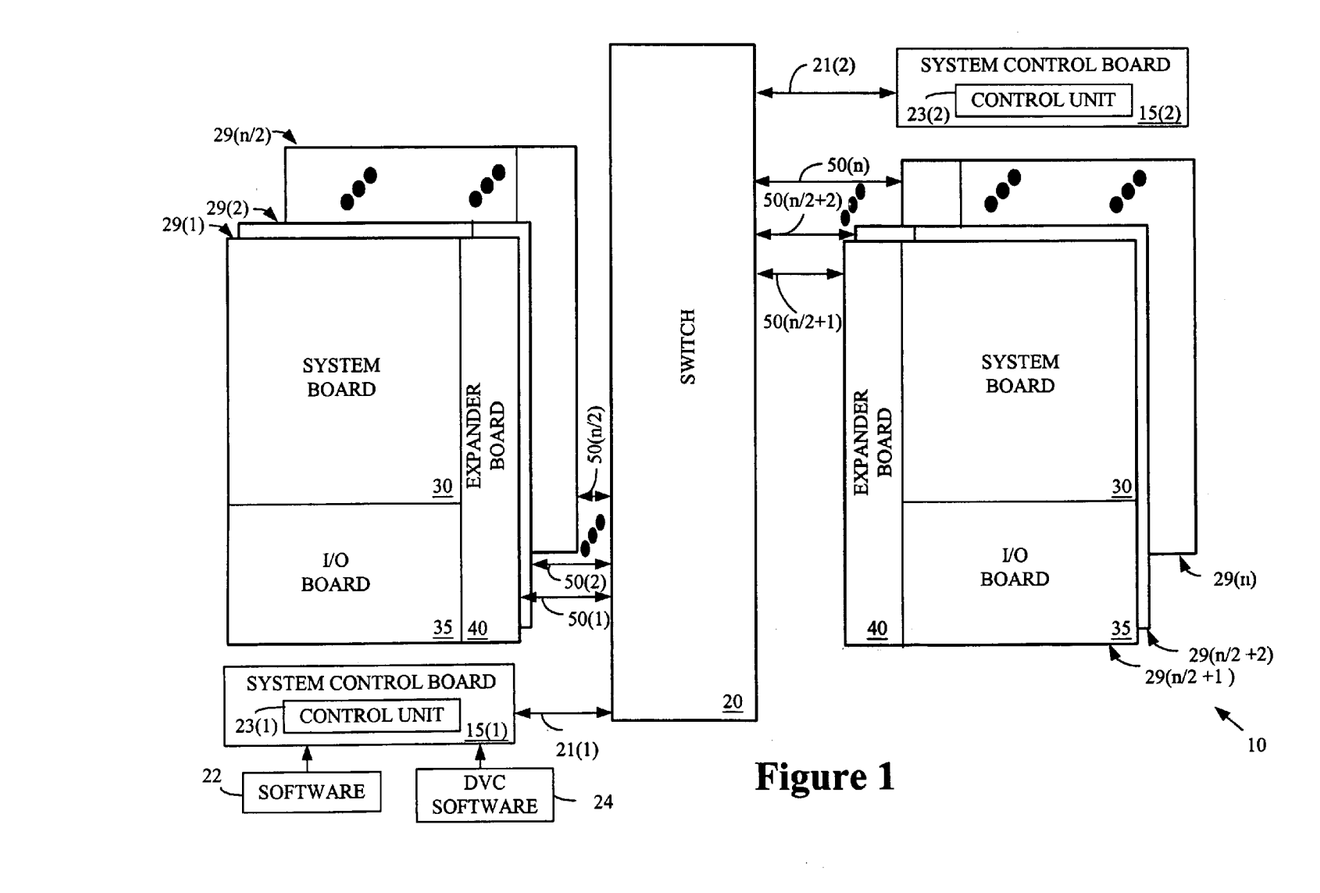
FIG. 1 shows a stylized block diagram of a system in accordance with one embodiment of the present invention.

Referring now to FIG. 1, a block diagram of a system 10 in accordance with one embodiment of the present invention is illustrated. The system 10, in one embodiment, includes a plurality of system control boards 15(1-2) that are coupled to a switch 20. For illustrative purposes, lines 21(1-2) are utilized to show that the system control boards 15(1-2) are coupled to the switch 20, although it should be appreciated that, in other embodiments, the boards 15(1-2) may be coupled to the switch in any of a variety of ways, including by edge connectors, cables, or other available interfaces.

In the illustrated embodiment, the system 10 includes two control boards 15(1-2), one for managing the overall operation of the system 10 and the other to provide redundancy and automatic failover in the event that the other board fails. Although not so limited, in the illustrated embodiment, the first system control board 15(1) serves as a "main" system control board, while the second system control board 15(2) serves as an alternate hot-swap replaceable system control board. In one embodiment, during any given moment, generally one of the two system control boards 15(1-2) actively controls the overall operations of the system 10.

If failures of the hardware or software occur on the main system control board 15(1) or failures on any hardware control path from the main system control board 15(1) to other system devices occur, the system controller failover software 22 automatically triggers a failover to the alternative control board 15(2). The alternative system control board 15(2), in one embodiment, assumes the role of the main system control board 15(1) and takes over the main system controller responsibilities. To accomplish the transition from the main system control board 15(1) to the alternative system control board 15(2), it may be desirable to replicate the system controller data, configuration, and/or log files on both of the system control boards 15(1-2). The system control boards 15(1-2) in the illustrated embodiment may each include a respective control unit 23(1-2).

The system 10, in one embodiment, includes a plurality of system board sets 29(1-n) that are coupled to the switch 20, as indicated by lines 50(1-n). The system board sets 29(1-n) may be coupled to the switch 20 in one of several ways, including edge connectors or other available interfaces. The switch 20 may serve as a communications conduit for the plurality of system board sets 29(1-n), half of which may be connected on one side of the switch 20 and the other half on the opposite side of the switch 20.

The switch 20, in one embodiment, may be a 18×18 crossbar switch that allows system board sets 29(1-n) and system control boards 15(1-2) to communicate, if desired. Thus, the switch 20 may allow the two system control boards 15(1-2) to communicate with each other or with other system board sets 29(1-n), as well as allow the system board sets 29(1-n) to communicate with each other.

The system board sets 29(1-n), in one embodiment, comprise one or more boards, including a system board 30, I/O board 35, and expander board 40. The system board 30 may include processors and associated memories for executing, in one embodiment, applications, including portions of an operating system. The I/O board 35 may manage I/O cards, such as peripheral component interface cards and optical cards, that are installed in the system 10. The expander board 40, in one embodiment, generally acts as a multiplexer (e.g. 2:1 multiplexer) to allow both the system and I/O boards 30, 35 to interface with the switch 20, which, in some instances, may have only one slot for interfacing with both boards 30, 35.

In one embodiment, the system 10 may be dynamically subdivided into a plurality of system domains, where each domain may have a separate boot disk (to execute a specific instance of the operating system, for example), separate disk storage, network interfaces, and/or I/O interfaces. Each domain, for example, may operate as a separate machine that performs a variety of user-configured services. For example, one or more domains may be designated as an application server, a web server, database server, and the like. In one embodiment, each domain may run its own operating system (e.g., Solaris operating system) and may be reconfigured without interrupting the operation of other domains.

Figure 2:
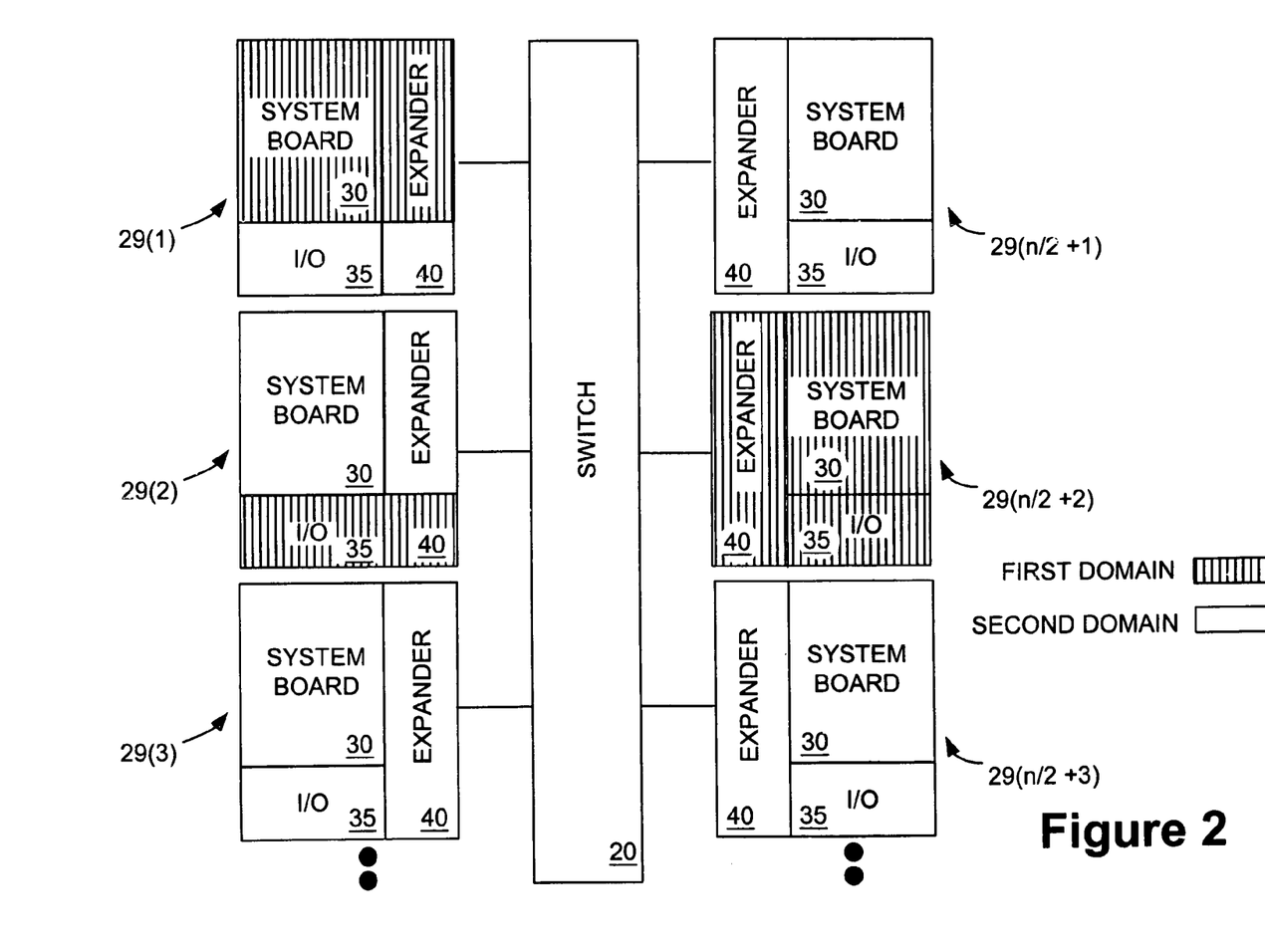
FIG. 2 illustrates a block diagram of an exemplary domain configuration that may be employed in the system of FIG. 1, in accordance with one embodiment of the present invention.

FIG. 2 illustrates an exemplary arrangement where at least two domains are defined in the system 10. The first domain, identified by vertical cross-sectional lines, includes the system board set 29(n/2+2), the system board 30 of the system board set 29(1), and the I/O board 35 of the system board set 29(2). The second domain in the illustrated embodiment includes the system board sets 29(3), 29(n/2+1), and 29(n/2+3), as well as the I/O board 35 of the system board set 29(1) and the system board 30 of the system board set 29(2).

As shown, a domain may be formed of an entire system board set 29(1-n), one or more boards (e.g., system board 30, I/O board 35) from selected system board sets 29(1-n), or a combination thereof. Although not necessary, it may be possible to define each system board set 29(1-n) as a separate domain. For example, if each system board set 29(1-n) were its own domain, the system 10 may conceivably have up to "n" (i.e., the number of system board sets) different domains. When two boards (e.g. system board 30, I/O board 35) from the same system board set 29(1-n) are in different domains, such a configuration is referred to as a "split expander." The expander board 40 of the system board sets 29(1-n), in one embodiment, keeps the transactions separate for each domain. No physical proximity may be needed for boards in a domain.

Using the switch 20, inter-domain communications may be possible. For example, the switch 20 may provide a high-speed communications path so that data may be exchanged between the first domain and the second domain of FIG. 2. In one embodiment, a separate path for data and address through the switch 20 may be used for inter-domain communications.

Figure 3:
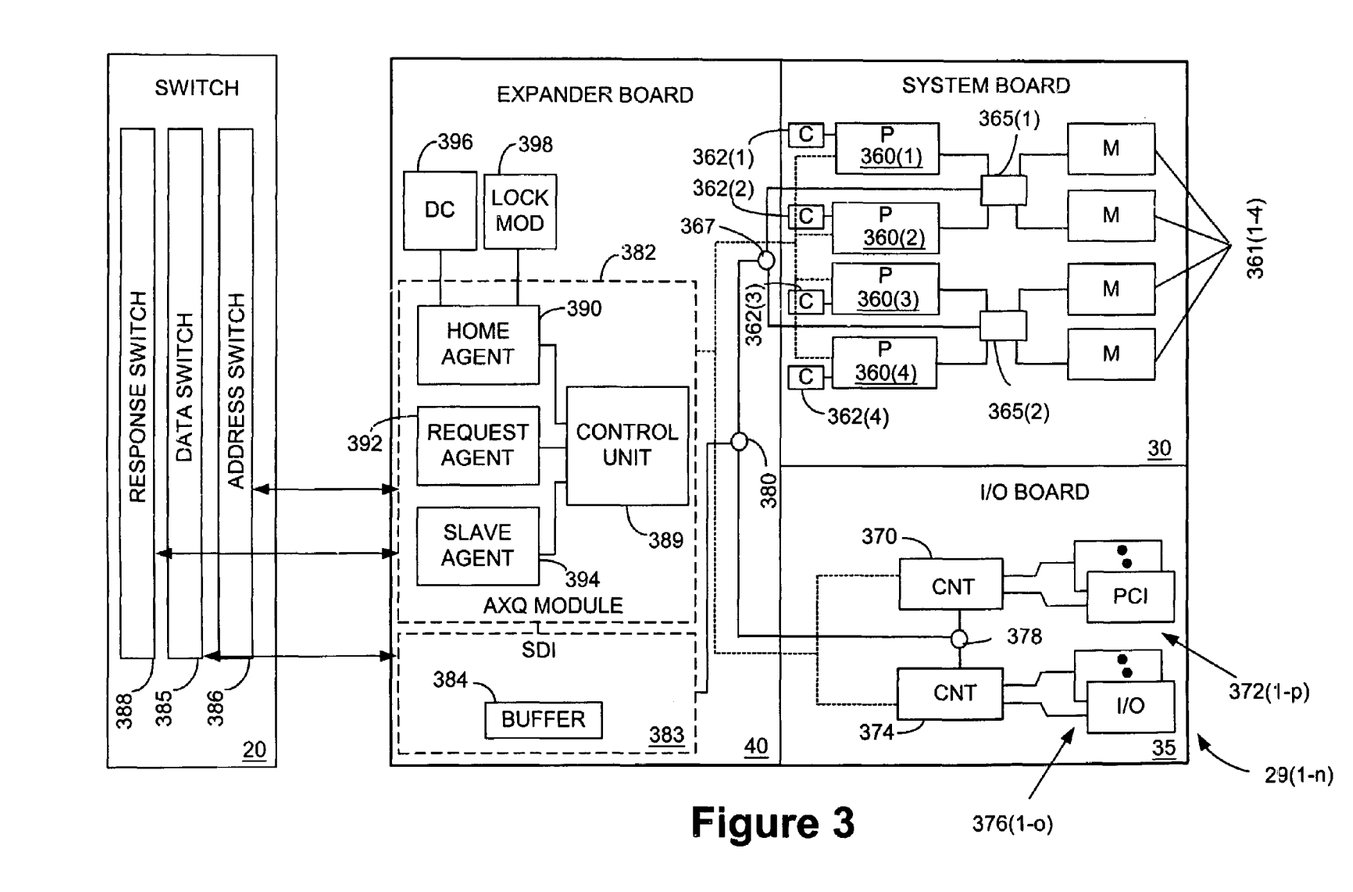
FIG. 3 depicts a stylized block diagram of one system board set that may be employed in the system of FIG. 1, in accordance with one embodiment of the present invention.

Referring now to FIG. 3, a block diagram of the system board set 29(1–n) coupled to the switch 20 is illustrated, in accordance with one embodiment of the present invention. The system board 30 of each system board set 29(1–n) in the illustrated embodiment includes four processors 360(1–4), with each of the processors 360(1–4) having an associated memory 361(1–4). In one embodiment, each of the processors 360(1–4) may be coupled to a respective cache memory 362(1–4). In other embodiments, each of the processors 360(1–4) may have more than one associated cache memories, wherein some or all of the one or more cache memories may reside within the processors 360(1–4). In one embodiment, each cache memory 362(1–4) may be a split cache, where a storage portion of the cache memory 362(1–4) may be external to the processor, and a control portion (e.g., tags and flags) may be resident inside the processors 360(1–4).

The processors 360(1–4), in one embodiment, may be able to access their own respective memories 360(1–4) and 362(1–4), as well as access the memories associated with other processors. In one embodiment, a different number of processors and memories may be employed in any desirable combination, depending on the implementation. In one embodiment, two five-port dual data switches 365(1–2) connect the processor/memory pairs (e.g., processors 360(1–2)/memories 361(1–2) and processors 360(3–4)/memories 361(3–4)) to a board data switch 367.

Although not so limited, the I/O board 35 of each system board set 29(1–n) in the illustrated embodiment includes a controller 370 for managing one or more of the PCI cards that may be installed in one or more PCI slots 372(1–p). In the illustrated embodiment, the I/O board 35 also includes a second controller 374 for managing one or more I/O cards that may be installed in one or more I/O slots 376(1–o). The I/O slots 376(1–o) may receive optics cards, network cards, and the like. The I/O board 35, in one embodiment, may communicate with the system control board 15(1–2) (see FIG. 1) over an internal network (not shown).

The two controllers 370, 374 of the I/O board 35, in one embodiment, are coupled to a data switch 378. A switch 380 in the expander board 40 receives the output signal from the switch 378 of the I/O board 35 and from the switch 367 of the system board set 29(1–n) and provides it to a System Data Interface (SDI) 383, in one embodiment. The SDI 383 may process data transactions to and from the switch 20 and the system and I/O boards 30 and 35. A separate address path (shown in dashed lines) is shown from the processors 360(1–4) and the controllers 370, 374 to an Address Expander Queue (AXQ) module 382. In the illustrated embodiment, the SDI 383 includes a buffer 384, described in more detail below. The AXQ module 382 may process address and response transactions to and from the switch 20 and the system and I/O boards 30 and 35.

In one embodiment, the switch 20 may include a data switch 385, address switch 386, and response switch 388 for transmitting respective data, address, and control signals provided by the AXQ module 382 of each expander board 40 of the system board sets 29(1–n). Thus, in one embodiment, the switch 20 may include three 18×18 crossbar switches that provide a separate data path, address path, and control signal path to allow intra- and inter-domain communications. Using separate paths for data, addresses, and control signals, may reduce the interference among data traffic, address traffic, and control signal traffic. In one embodiment, the switch 20 may provide a bandwidth of about 43 Gigabytes per second. In other embodiments, a higher or lower bandwidth may be achieved using the switch 20.

It should be noted that the arrangement and/or location of various components (e.g., AXQ module 382, processors 360(1–4), controllers 370, 374) within each system board set 29(1–4) is matter of design choice, and thus may vary from one implementation to another. Additionally, more or fewer components may be employed without deviating from the scope of the present invention.

Cache coherency may be performed at two different levels, one at the intra-system board set 29(1–n) level and one at the inter-system board set 29(1–n) level. With respect to the first level, cache coherency within each system board set 29(1–n) is performed, in one embodiment, using conventional cache coherency snooping techniques, such as the modified, exclusive, shared, and invalid (MESI) cache coherency protocol. As such, the processors 362(1–n) may broadcast transactions to other devices within the system board set 29(1–n), where the appropriate device(s) may then respond with the desired results or data.

Because the number of devices within the system board set 29(1–n) may be relatively small, a conventional coherency snooping technique, in which requests are commonly broadcasted to other devices, may adequately achieve the desired objective. However, because the system 10 may contain a large number of system board sets 29(1–n), each having one or more processors, memory accesses may require a large number of broadcasts before such requests can be serviced. Accordingly, a second level of coherency may be performed at the system level (between the expander boards 40) by the AXQ module 382 of each expander board 40 using, in one embodiment, the scalable shared memory (SSM) protocol.

The AXQ module 382, in one embodiment, includes a control unit 389 coupled to a home agent 390, a request agent 392, and a slave agent 394. Collectively, the agents 390, 392, 394 may operate to aid in maintaining system-wide coherency. In the illustrated embodiment, the control unit 389 of the AXQ module 382 interconnects the system board 30 and the I/O board 35 as well as interconnects the home agent 390, request agent 392, slave agent 394 within the AXQ module 382. In one embodiment, if the expander board 40 is split between two domains (i.e., the system and the I/O boards 30 and 35 of one system board set 29(1–n) are in different domains), the control unit 389 of the AXQ module 382 may arbitrate the system board 30 and I/O board 35 separately, one on odd cycles, and the other on even cycles.

The SSM protocol uses MTags embedded in the data to control what the devices under the control of each expander board 40 can do to a cache line. The MTags may be stored in the caches 362(1–4) of each system board set 29(1–n). Table 1 below illustrates three types of values that may be associated with MTags.

TABLE 1

| MTag Type | Description |
| --- | --- |
| Invalid (gI) | No read or write allowed for this type of line. A device must ask for a new value before completing an operation with this line. |
| Shared (gS) | A read may complete, but not a write. |

TABLE 1-continued

| MTag Type | Description |
|---|---|
| Modifiable (gM) | Both reads and writes are permitted to this line. |

As mentioned, the Mtag states are employed in the illustrated embodiment in addition to the conventional MESI cache coherency protocol. For example, to do a write, a device should have a copy of the line that is both M and gM. If the line is gM but not M, then the status of the line may be promoted to M with a transaction within the expander board 40; if the line is not gM, then a remote transaction may have to be done involving the cache AXQ module 382, which, as mentioned, employs the SSM protocol in one embodiment.

The AXQ module 382, in one embodiment, controls a directory cache (DC) 396 that holds information about lines of memory that have been recently referenced using the SSM protocol. The DC 396, in one embodiment, may be stored in a volatile memory, such as a static random access memory (SRAM). The DC 396 may be a partial directory in that it may not have enough entry slots to hold all of the cacheable lines that are associated with a given expander board 40. The AXQ module 382 controls a locking module 398 that prevents access to a selected entry in the directory cache 396 when the status of that entry, for example, is being updated.

Figures 4A, 4B:
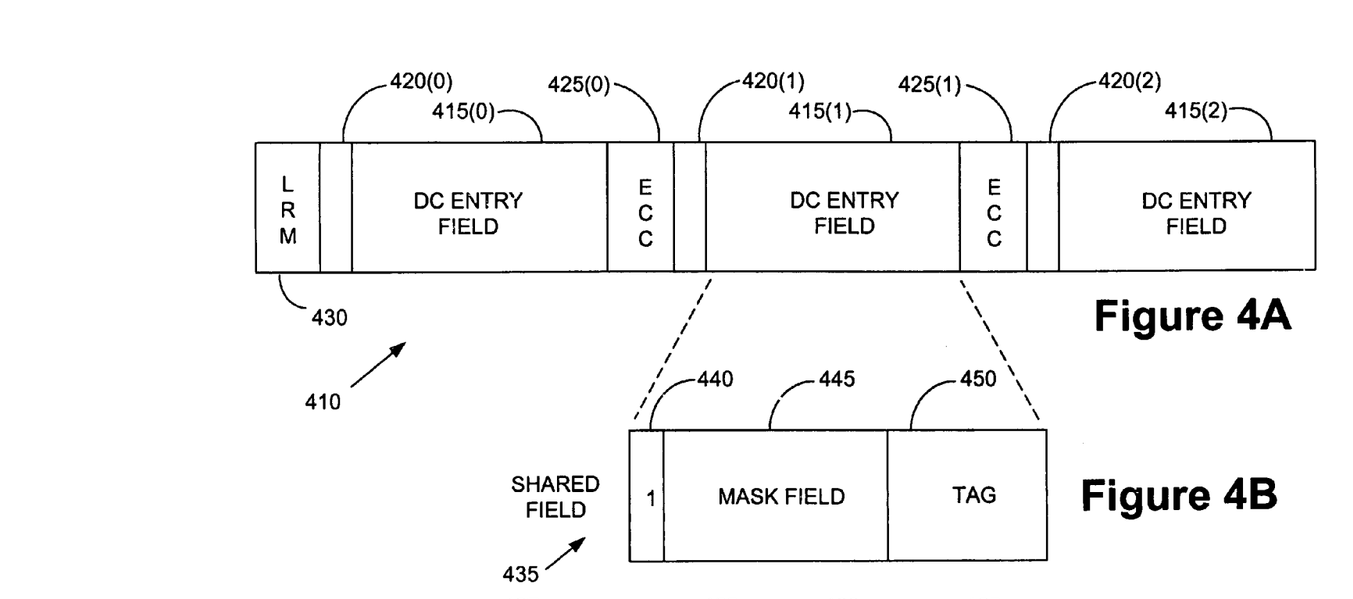
FIGS. 4A–C illustrate an exemplary directory cache entry that may be employed in the system of FIG. 1, in accordance with one embodiment of the present invention.

The DC 396 may be capable of caching a predefined number of directory entries corresponding to cache lines of the caches 362(1–4) for a given system board 30. The DC 396 may be chosen to be of a suitable size so that a reasonable number of commonly used memory blocks may generally be cached. Although not so limited, in the illustrated embodiment, the DC 396 is a 3-way set-associative cache, formed of three SRAMs that can be read in parallel. An exemplary 3-wide DC entry 410 is shown in FIG. 4A. The DC 396, in one embodiment, includes a plurality of the 3-wide DC entries (collectively part of a "set") 410. Each DC entry in a given set 410 may be indexed by a hash of the address.

As shown in FIG. 4A, in one embodiment, each of the three DC entry fields 415(0–2) has an associated address parity field 420(0–2). The address parity field 420(0–2) in the illustrated embodiment is a one-bit field that enables error detection in the address being sent from the AXQ module 382 to the directory cache 396. An error in the address that is being transmitted from the AXQ module 382 to the directory cache 396 may occur for one of a variety of reasons, including because of a faulty wiring connection between the AXQ module 382 and the directory cache 396, a faulty pin on either the AXQ module 382 or directory cache 396, and the like.

The set 410 of the directory cache includes two error correction code (ECC) fields 425(0–1), each being a 4-bit field in the illustrated embodiment. In case of errors, the ECC field 425(0–1) may allow error correction in the data stored in the set 410, depending on the number of bit errors. For example, in one embodiment, the contents of the ECC field 425(0–1) may be utilized to detect and correct a single-bit error.

Each 3-wide DC entry 410 includes a least recently modified (LRM) field 430 that may identify which of the three DC entry fields 415(0–2) was least recently modified. Although other encoding techniques may be employed, in the illustrated embodiment, three bits are used to identify the LRM entry. An exemplary list of LRM codes employed in the illustrated embodiment is provided in Table 2 below.

TABLE 2

DC Least-Recently-Modified encoding

| LRM | Most Recent | Middle | Least Recent |
|---|---|---|---|
| 000 | Entry 0 | Entry 1 | Entry 2 |
| 001 | Entry 1 | Entry 0 | Entry 2 |
| 010 | Entry 2 | Entry 0 | Entry 1 |
| 011 | *** undefined state *** | | |
| 100 | Entry 0 | Entry 2 | Entry 1 |
| 101 | Entry 1 | Entry 2 | Entry 0 |
| 110 | Entry 2 | Entry 1 | Entry 0 |
| 111 | *** undefined state *** | | |

As indicated in the exemplary LRM encoding scheme of Table 2, various combinations of bits in the LRM field 430 identifies the order in which the three entry fields 415(0–2) in the DC 396 were modified. As an example, the digits '000' (i.e., the first entry in Table 2), indicate that the entry field 415(2) was least recently modified, followed by the middle entry field 415(1), and then the first entry field 415(0), which was most recently modified. As an added example, the digits '101' indicate that the entry field 415(0) was least recently modified, followed by the entry field 415(2), and then the entry field 415(1), which was most recently modified.

Although not so limited, in the illustrated embodiment, each set 410 in the directory cache 396 includes a total of 108 bits—94 bits of data, 3 LRM bits, 3 address parity bits, and 8 ECC bits.

Figure 4C:
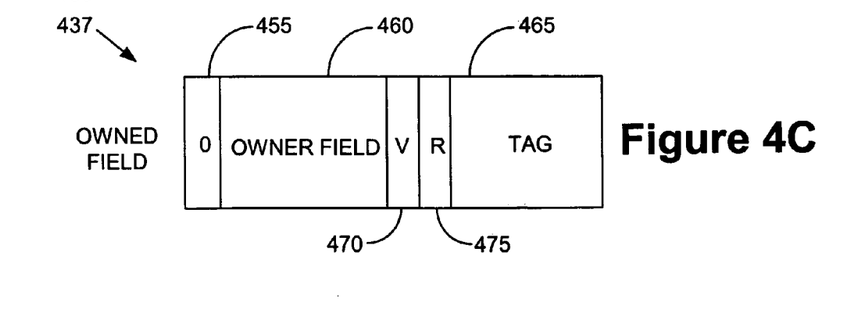

In one embodiment, two different types of entries, a shared entry 435 and an owned entry 437, may be stored in the entry fields 415(0–2) of the DC 396, as shown in FIGS. 4B–C. An owned entry 437, in one embodiment, signifies that a particular expander board 40 has both read and write access for that particular entry. A shared entry 435, in one embodiment, indicates that one or more expander boards 40 have read, but not write, access for that particular entry.

The shared entry 435, in one embodiment, includes an identifier field 440, a mask field 445, and an address tag field 450. The identifier field 440, in the illustrated embodiment, is a single bit field 440, which, if equal to bit 1, indicates that the stored cache line is shared by one or more of the processors 360(1–4) of the system board sets 29(1–n) in the system 10. The mask field 445, which may have up to "n" bits (i.e., one bit for each of the system board sets 29(1–n)), identifies through a series of bits which of the system boards 30 of the system board sets 29(1–n), has a shared copy of the cache line. The address tag field 450 may store at least a portion of the address field of the corresponding cache line, in one embodiment.

The owned entry 437 includes an identifier field 455, an owner field 460, an address tag field 465, a valid field 470, and a retention bit field 475, in one embodiment. The identifier field 455, in the illustrated embodiment, is a single bit field 440, which, if equal to bit 0, indicates that the stored cache line is owned by one of the processors 360(1–4) of the system board sets 29(1–n) in the system 10. The owner field 460 is adapted to store the identity of a particular expander board 40 of the system board sets 29(1–n) that holds the valid copy of the cache line. The address tag field 465 may be adapted to store at least an identifying portion of the address field of the corresponding cache line, in one embodiment. For example, the tag field 465 may be comprised of the upper order bits of the address. The valid field 470, in one embodiment, indicates if the corresponding entry in the DC 396 is valid. An entry in the DC 396 may be invalid at start-up, for example, when the system 10 or domain in the system 10 is first initialized.

Figure 5:
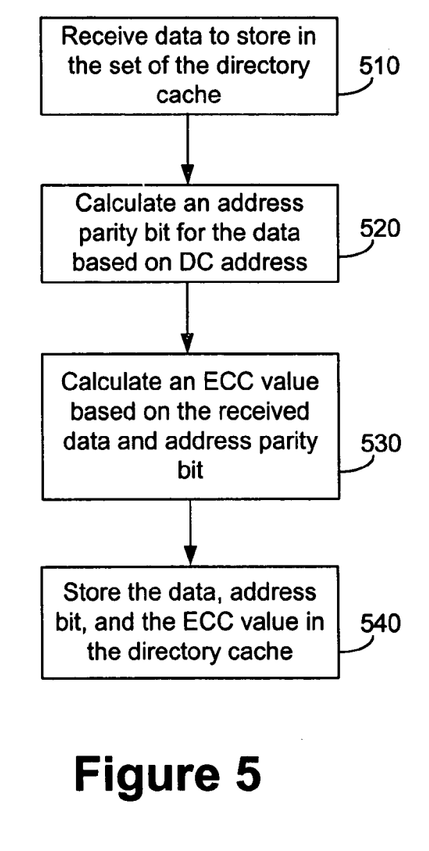
FIG. 5 illustrates flow diagram of a method for storing an entry in a directory cache of the system of FIG. 1, in accordance with one embodiment of the present invention.

Referring now to FIG. 5, a flow diagram of a method of storing data in each set 410 (see FIG. 4) of the directory cache 396 (see FIG. 3) is illustrated, in accordance with one embodiment of the present invention. The AXQ module 382 (see FIG. 3) receives (at 510) data to store in the entry 415(0–2) of the set 410 of the directory cache 396. Data may be received (at 510), for example, when it is desirable to store one or more entries in the directory cache 396. The term "data," as utilized herein, refers to information stored in one or more of the entry fields 415(1–2) (see FIG. 4A) of each set 410.

The AXQ module 382 calculates (at 520) one or more address parity bits for the data received (at 520) based on the directory cache address of where that data is to be stored. For example, based on the address location of where the received data is to be stored in the directory cache 396, the AXQ module 382 calculates the appropriate address parity bits for storage in the address parity fields 420(0–2) (see FIG. 4) of the set 410. In one embodiment, data that is stored in an entry 415(0–2) of the set 410 of the directory cache 396 has the same address parity bit as other entries 415(0–2) in that set 410.

The AXQ module 382 in the illustrated embodiment calculates (at 530) an ECC value based on the data received (at 510) and the one or more address parity bits calculated (at 520) earlier. In one embodiment, the ECC value calculated (at 530) may be an 8-bit ECC value, with four bits beings stored in the ECC field 425(0) and other four in the ECC field 425(1).

The AXQ module 382, upon calculating (at 530) the ECC value, stores (at 540) the data in the fields 415(0–2), address parity bits in the address parity fields 420(0–2), and the ECC value in the ECC fields 425(0–1) of the set 410 of the directory cache 396.

Figure 6A:
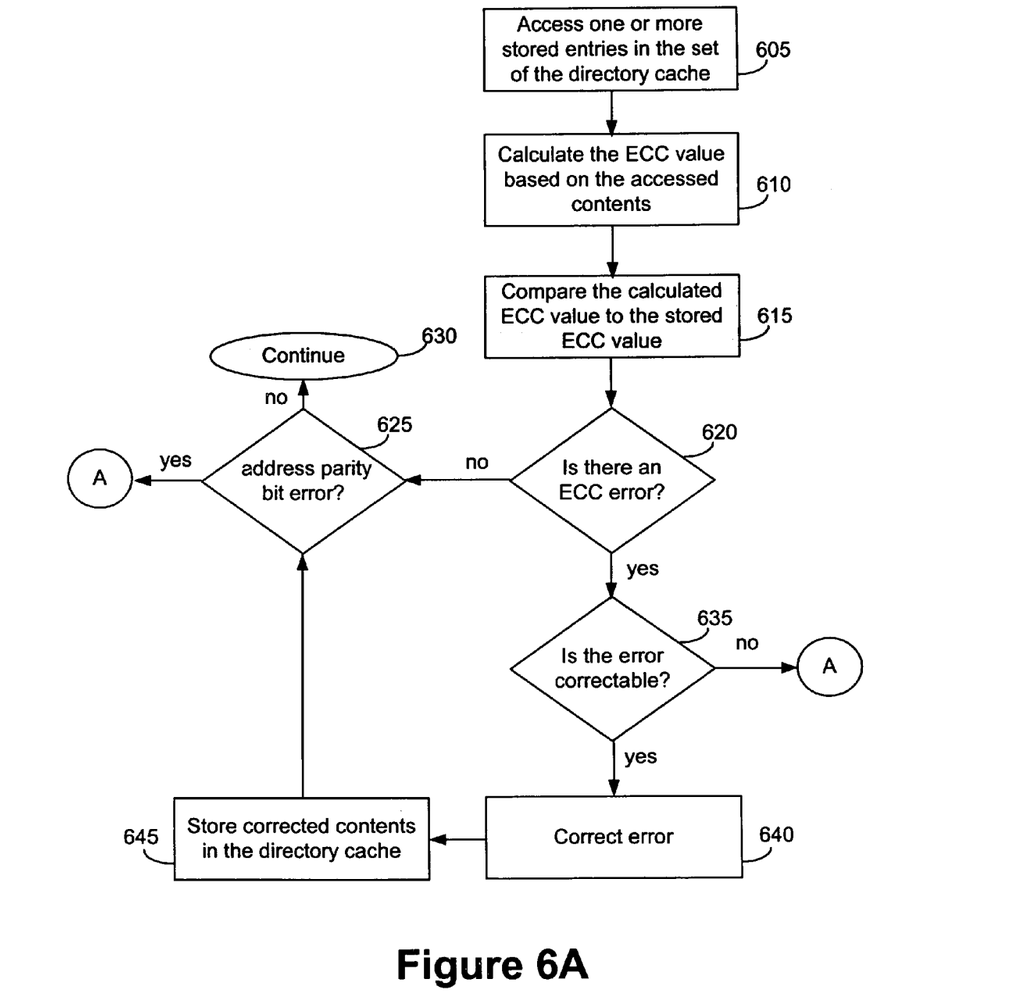
FIGS. 6A–B illustrate a flow diagram of a method for error recovery in a directory cache of the system of FIG. 1, in accordance with one embodiment of the present invention.
Figure 6B:
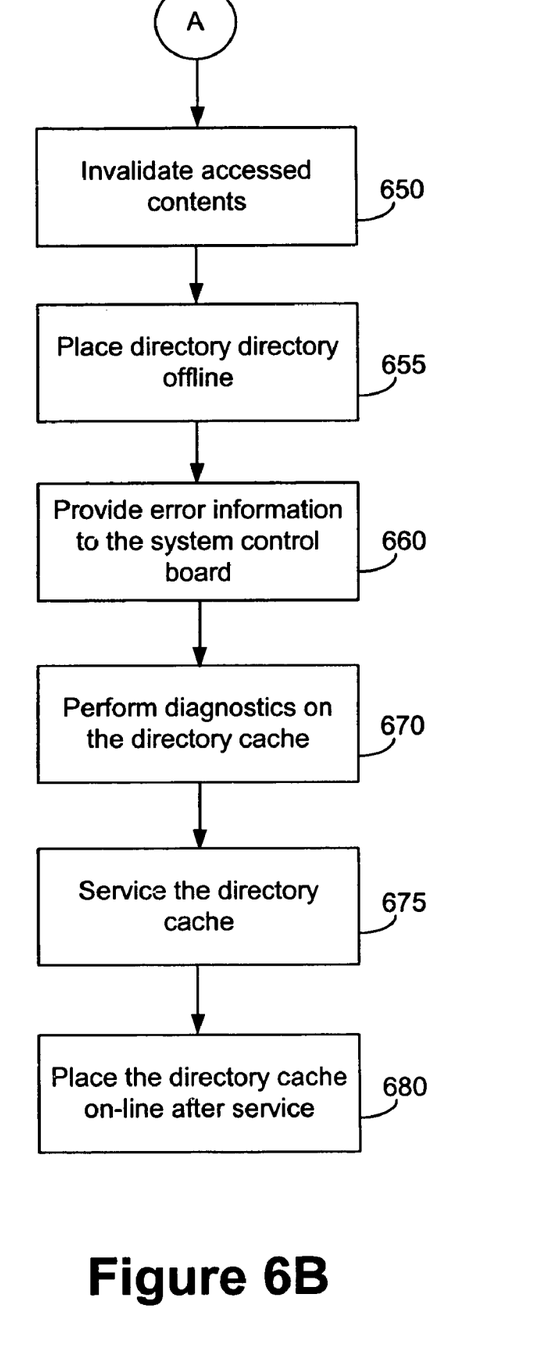

Referring now to FIGS. 6A–B, a flow diagram of a method of correcting one or more errors in the directory cache 396 is illustrated, in accordance with one embodiment of the present invention. The AXQ module 382 accesses (at 605) one or more stored entries in the set 410 of the directory cache 396. In one embodiment, accessing (at 605) the stored entries may include reading the contents of the various fields of the set 410, including the LRM bits, address parity bits, ECC value, and the data stored in the entry fields 415(0–2). In one embodiment, the contents of the entire set 410 may be accessed (at 605). It should be appreciated that some of the entry fields 415(0–2) may not have valid data stored therein, and may thus simply contain zeros, ones or some disregardable combination thereof.

The AXQ module 382 calculates (at 610) an ECC value based on the contents of the one or more entries accessed (at 605). Thus, in one embodiment, the AXQ module 382 may calculate the ECC value based on the contents from the entry fields 415(0–2), LRM field 430, address parity fields 420 (0–2).

The AXQ module 382 compares (at 615) the calculated (at 610) ECC value with the ECC value stored in the ECC fields 425(0–1). Based on the comparison (at 615) of the ECC values, the AXQ module 382 determines (at 620) if one or more errors exist in the contents accessed (at 605) from the directory cache 396. It should be noted that an error may exist in the address parity bit, LRM bit, or data stored in the entries 415(0–2) of the set 410 of the directory cache 396.

If it is determined (at 620) that no error exists, then the AXQ module 382 determines (at 625) if an address parity bit error exists in the contents accessed (at 605). An address parity bit error may be determined (at 625), for example, if the calculated (at 610) address bits correspond to the parity bits that are associated with the address from which the entries were accessed (at 605) by the AXQ module 382. If it is determined (at 625) that no address parity bit error exists, then the AXQ module 382 may continue (at 630) with other operations, in one embodiment.

If the AXQ module 382 determines (at 620) that an error exists in the contents accessed (at 605) from the set 410, then the AXQ module 382 determines (at 635) if that error is correctable. An error may be not "correctable" if the error detection and correction techniques, such as ECC or parity bits, are unable to detect and cure the error. In one embodiment, whether a particular error is "correctable" may depend on the number of error bits that need to be corrected once the error is discovered. For example, in the illustrated embodiment, a one-bit error may be correctable using the ECC value, but a two-bit error may not be correctable (i.e., an 8-bit ECC value may be used to correct a single-bit error, but not a two-bit error). Assuming it is determined (at 640) that the error is correctable, then the AXQ module 382 corrects the error based on the ECC value. The error corrected (at 645) may then be stored (at 645) back to the location in the directory cache 396 from which it was accessed (at 605) by the AXQ module 382. After storing (at 625) the data, in one embodiment, the AXQ module 382 determines (at 625) if an address parity bit error exists in the contents accessed (at 605).

If it is determined (at 625) that an address parity bit error exists or if it is determined (at 635) that the error is not correctable, then the AXQ module 382 invalidates (at 650— See FIG. 6B) the contents accessed (at 605) from the directory cache 396. Invalidating (at 650) the contents, in one embodiment, includes disregarding the contents from the directory cache 396 and indicating a cache miss to the device requesting the information.

The AXQ module 382 places (at 655) the directory cache 396 offline since the directory cache 396 may be inoperable or partially inoperable for one of a variety of reasons. The directory cache 396, in one embodiment, may be placed (at 655) offline by setting a bit in the AXQ module 382 indicating that the directory cache 396 is not available. While the performance of a domain may adversely be affected while the directory cache 396 is offline, the domain, in one embodiment, may nevertheless continue to operate. Once the directory cache 396 is placed (at 655) off-line, all subsequent accesses to the directory cache 396 may be treated as misses. In one embodiment, the directory cache 396 may be placed (at 655) off-line dynamically, while the domain or the expansion board 40 (see FIG. 3) to which the directory cache 396 belongs is active or in operation.

In the illustrated embodiment, the AXQ module 382 provides (at 660) the error information to the system control board 15(1–2) (see FIG. 1). The error information may include information indicating the source of the failure. For example, in one embodiment, the AXQ module 382 may indicate that an address parity bit failed for a selected portion of the directory cache 396, thereby indicating that address-related problems may be present. As an additional example, the AXQ module 382 may indicate that an uncorrectable error exists in a selected portion of the directory cache 396, thereby signifying a problem with the storage RAMs, for example.

The system control board 15(1–2) may perform (at 670) diagnostics on the directory cache 396 based on the error information provided (at 660) by the AXQ module 382. The diagnostic tests may aid in solving one or more problems with directory cache 396. The directory cache 396 may be serviced (at 675) based on the diagnostics performed (at 670). In some instances, the system control board 15(1–2) may be able to resolve an identified problem. In other instances, the system control board 15(1–2) may indicate to a system administrator the nature of the problem with the directory cache 396. The system administrator may then resolve any outstanding problems with the directory cache 396.

In one embodiment, the directory cache 396 may be tested (at 670) and serviced (at 675) dynamically, while the domain or the expansion board 40 to which the directory cache 396 belongs is active or in operation.

The AXQ module 382 may place (at 680) the directory cache 396 on-line after the directory cache 396 has been serviced (at 675). In one embodiment, the directory cache 396 may be brought on-line by resetting a bit in the AXQ module 382, where the bit is indicative of whether the directory cache 396 is available to the other resources of the domain in the system 10. In one embodiment, the directory cache 396 may be placed (at 680) on-line dynamically, while the domain or the expansion board 40 (see FIG. 3) to which the directory cache 396 belongs is active or in operation.

For ease of illustration, several references to "cache line" or "cache lines" are made in the discussion herein with respect to memory access. It should be appreciated that a "cache line," as utilized in this discussion, may include one or more bits of information that is retrieved from the caches 362(1–4) (see FIG. 3) in the system 10.

While one or more embodiments have been described herein in the context of the directory cache 396 (see FIG. 3), it should be appreciated that one or more embodiments of the present invention may also be applicable to other storage devices, including a main memory, a cache, a hard drive, and the like.

The various system layers, routines, or modules may be executable control units (such as control unit 389 (see FIG. 3). Each control unit may include a microprocessor, a microcontroller, a digital signal processor, a processor card (including one or more microprocessors or controllers), or other control or computing devices.

The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
   detecting an error in data stored in a directory cache in a system;
   determining if the detected error is correctable;
   while the system is in operation:
   making at least a portion of the directory cache unavailable to one or more resources in the system in response to determining that the error is uncorrectable, wherein making at least the portion of the directory cache unavailable comprises generating a cache miss in response to a request to access the directory cache;
   testing the at least a portion of the directory cache while the at least a portion of the directory cache is offline based on determining that the error is uncorrectable;
   servicing the at least a portion of the directory cache in response to testing the directory cache; and
   dynamically allowing access to the at least a portion of the directory cache in response to servicing the at least a portion of the directory cache.

2. The method of claim 1, wherein detecting the error comprises detecting the error in the data using error correction code.

3. The method of claim 2, wherein determining if the detected error is correctable comprises determining that the detected error is a multi-bit error.

4. The method of claim 1, wherein determining if the detected error is correctable comprises determining that the detected error is an address parity error.

5. An apparatus, comprising:
   a directory cache that is associated with a domain and adapted to store at least one entry; and
   a control unit adapted to:
   determine if at least one uncorrectable error exists in the directory cache;
   place at least a portion of the directory cache offline in response to determining that the error is uncorrectable, wherein placing at least the portion of the directory cache unavailable comprises generating a cache miss in response to a request to access the directory cache;
   place the at least a portion of the directory cache offline while the domain remains active;
   test the directory cache while the at least a portion of the directory cache is offline in response to determining that the error is uncorrectable;
   cause the directory cache to be serviced in response to testing the directory cache; and
   place the at least a portion of the directory cache on-line in response to causing the directory cache to be serviced.

6. The apparatus of claim 5, wherein the directory cache is a three-way associative directory cache.

7. The apparatus of claim 5, wherein the control unit determines if the entry contains a multi-bit error.

8. The apparatus of claim 7, wherein entry is an address bit entry, and wherein the control unit determines if the address parity bit entry contains an error.

9. The apparatus of claim 5, wherein the control unit provides a cache miss to a device requesting to access the directory cache while the directory cache is offline.

10. The apparatus of claim 5, wherein the control unit places the directory cache online dynamically.

11. A computer readable medium containing instructions that when executed enable a processor to:
- determine a multiple-bit error in data stored in a directory cache of a domain;
- isolate at least a portion of the directory cache from one or more resources in the domain while the domain is active, in response to determining the multiple-bit error;
- place the at least a portion of the directory cache offline while the domain remains active;
- wherein isolating at least the portion of the directory cache comprises generating a cache miss in response to a request to access the directory cache while the at least a portion of the directory cache is offline;
- dynamically test the at least the portion of the directory cache in response to isolating the directory;
- cause the directory cache to be serviced in response to testing the directory cache; and
- dynamically restore the directory cache in the domain in response to causing the directory cache to be serviced.

12. The computer readable medium of claim 11, wherein the instructions when executed enable the processor to perform an ECC error check to determine the multiple-bit error in the data.

13. The computer readable medium of claim 11, wherein the instructions when executed enable the processor to provide a cause of the multiple-bit error.

* * * * *